United States Patent [19]

Cowart

[11] Patent Number: 5,193,609
[45] Date of Patent: Mar. 16, 1993

[54] LOW PROFILE HEATING AND COLLING UNIT FOR VEHICLES

[76] Inventor: Darrow W. Cowart, 5702 Fireside, Arlington, Tex. 76016

[21] Appl. No.: 789,611

[22] Filed: Nov. 8, 1991

Related U.S. Application Data

[63] Continuation of Ser. No. 707,239, May 22, 1990, abandoned, which is a continuation of Ser. No. 511,079, Apr. 19, 1990, abandoned.

[51] Int. Cl.$^5$ .............................................. B60H 1/04
[52] U.S. Cl. ...................................... 165/42; 165/122
[58] Field of Search .................... 165/42, 43, 122, 126; 454/159

[56] References Cited

U.S. PATENT DOCUMENTS

| | | | |
|---|---|---|---|
| D. 296,466 | 6/1988 | Gratton | D23/324 |
| D. 298,453 | 11/1988 | Gratton | D23/325 |
| 2,065,328 | 12/1936 | Hadley | 454/159 X |
| 2,134,648 | 10/1938 | Will et al. | 165/122 X |
| 2,139,612 | 12/1938 | Wilson | 454/159 X |
| 2,213,018 | 8/1940 | Perkins | 454/159 X |
| 2,214,165 | 9/1940 | Fink | 454/159 X |
| 2,234,268 | 3/1941 | McCollum | 454/159 X |
| 2,270,977 | 1/1942 | Spackman | 454/159 X |
| 2,346,410 | 4/1944 | Ashley et al. | 165/122 X |
| 2,900,172 | 8/1959 | Schofield | 165/122 |
| 3,319,946 | 5/1967 | Fulton, Jr. | 165/122 X |
| 3,406,904 | 10/1968 | Muzzi et al. | 165/126 X |
| 3,799,255 | 3/1974 | Luderssen | 165/122 |
| 4,841,742 | 6/1989 | Biby | 165/122 X |
| 4,842,046 | 6/1989 | Stech | 165/42 |
| 4,898,003 | 2/1990 | Ichikawa et al. | 165/122 X |

*Primary Examiner*—William E. Tapolcai
*Attorney, Agent, or Firm*—Melvin A. Hunn

[57] ABSTRACT

A vehicle air treatment unit includes a number of components which cooperate together. A temperature exchange coil is housed in a coil housing. The coil housing has an input port for receiving air from the interior of the vehicle and an exhaust port. A blower motor is disposed in the coil housing adjacent the temperature exchange coils, and has a shaft oriented toward the exhaust port of the coil housing. A motor mount is coupled to the coil housing at the exhaust port for coupling the blower motor in a fixed position relative to the coil housing. A blower wheel is coupled to the motor shaft at the exhaust of the coil housing, in axial alignment with the temperature exchange coils. A blower housing in disposed about the blower wheel. The blower motor operates to pull air from the interior of the vehicle and through the temperature exchange coils by rotating the blower wheel within the blower housing.

10 Claims, 5 Drawing Sheets

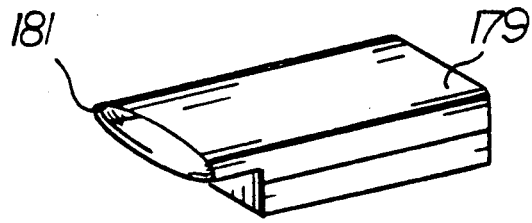
FIGURE 4a
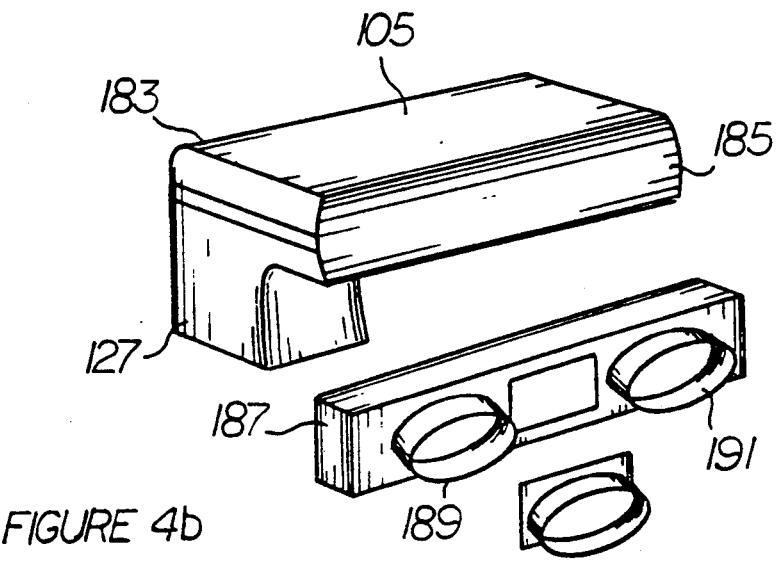
FIGURE 4b
FIGURE 4

LOW PROFILE HEATING AND COLLING UNIT FOR VEHICLES

This application is a continuation of application Ser. No. 707,239, filed May 22, 1990, now abandoned, which is a continuation of application Ser. No. 511,079, filed Apr. 19, 1990, now abandoned.

BACKGROUND OF THE INVENTION

1. Field of the Invention

The present invention relates generally to air conditioning units, and specifically to an air conditioning unit for vehicles.

2. Description of the Prior Art

Many vintage vehicles are equipped with heaters, but lack air conditioning units for cooling the interior of the vehicle. Even many new vehicles lack cooling capabilities. The owners of these vehicles frequently live in climates which are quite uncomfortable without air conditioning. Many retrofit air conditioning units exist for placement inside vehicles for selective heating or cooling of the interior of the vehicle.

It is important that the heating and cooling unit be as small as possible to minimize the space requirement of the retrofit heating-cooling unit, since maximizing vehicle interior space is one overriding design criteria for vehicles.

It is also important that blown air be directed through as few turns as possible, since each turn in a heating or cooling system diminishes the velocity at which the heated or cooled air is delivered. In vehicles with large interior space, high air speed is important in ensuring that the entire vehicle interior is adequately heated or cooled.

SUMMARY OF THE INVENTION

It is one objective to provide a vehicle heating and cooling unit which is as compact as possible.

It is another objective of the present invention to provide a vehicle heating and cooling unit which minimizes the distance the heated or cooled air has to travel between the heat/cool coils and the blower.

It is yet another objective of the present invention to provide a vehicle heating and cooling unit which minimizes the number of turns of the heated or cooled air between the heat/cool coils and the vehicle vents.

It is still another objective of the present invention to provide a vehicle heating and cooling unit in which the blower is positioned between the heat/cool coils and the vehicle vents, pulling air through the heat/cool coils.

These and other objectives are achieved as is now described. A vehicle air treatment unit includes a number of components which cooperate together. A temperature exchange coil is housed in a coil housing. The coil housing has an input port for receiving air from the interior of the vehicle and an exhaust port. a blower motor is disposed in the coil housing adjacent the temperature exchange coils, and has a shaft oriented toward the exhaust port of the coil housing. A motor mount is coupled to the coil housing at the exhaust port for coupling the blower motor in a fixed position relative to the coil housing. A blower wheel is coupled to the motor shaft at the exhaust of the coil housing, in axial alignment with the temperature exchange coils. A blower housing in disposed about the blower wheel. The blower motor operates to pull air through the temperature exchange coils by rotating the blower wheel within the blower housing.

The above as well as additional objects, features, and advantages of the invention will become apparent in the following detailed description.

BRIEF DESCRIPTION OF THE DRAWING

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

FIG. 4a is a perspective view of a defrost clearance adaptor for use with the preferred vehicle heating and cooling unit of the present invention;

FIG. 4b is a perspective view of an alternate plenum for the vehicle heating and cooling unit of the present invention, without defrost capability;

DETAILED DESCRIPTION OF THE INVENTION

Figure 1:
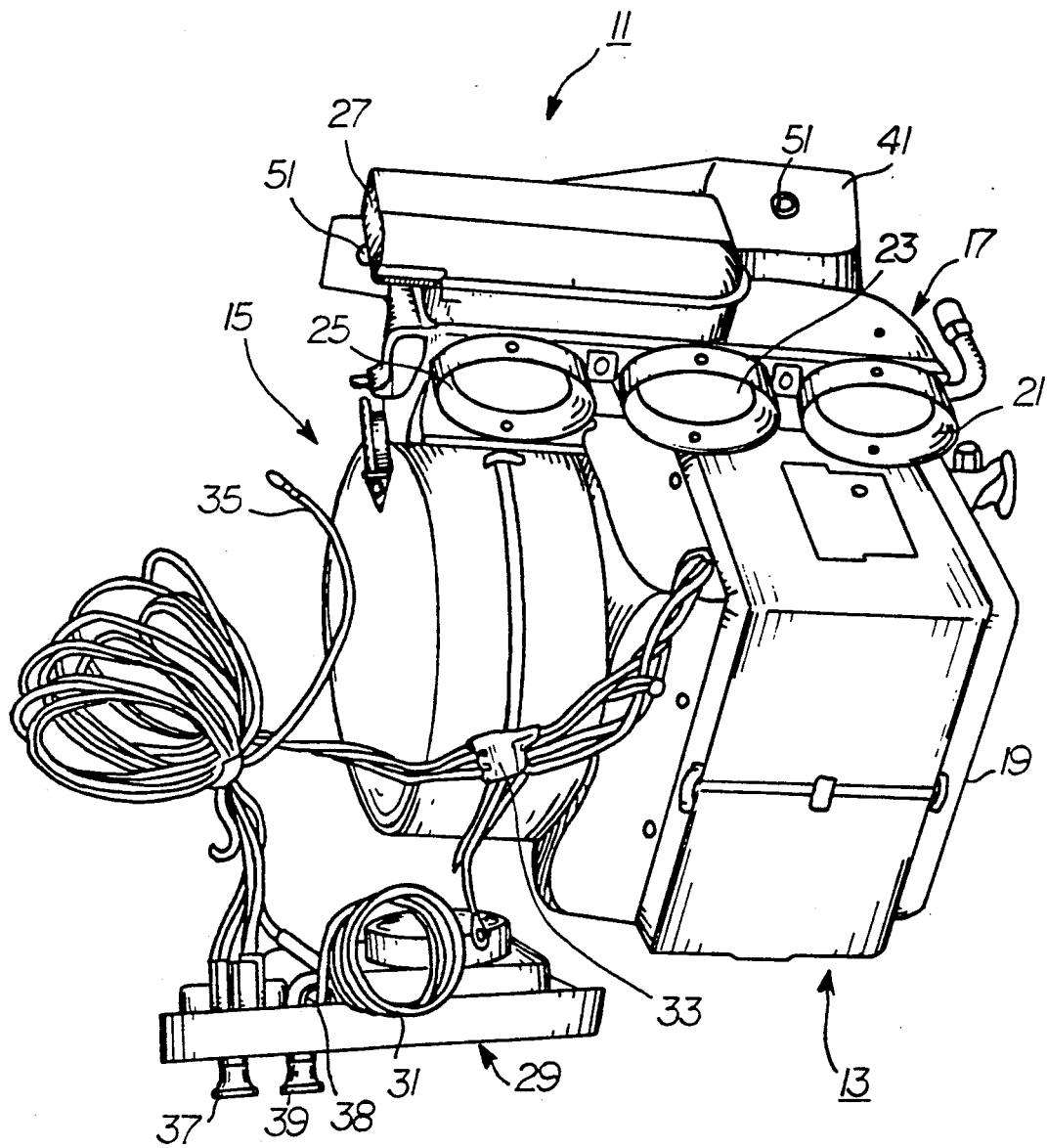
FIG. 1 is a perspective view of the vehicle heating and cooling unit of the present invention.

FIG. 1 is a perspective View of the vehicle heating and cooling unit 11 of the present invention. Heating and cooling unit 11 includes a temperature exchange assembly 13 which is directly coupled to an adjacent blower assembly 15. Plenum assembly 17 is coupled to blower assembly 15, and is disposed directly above blower assembly 15 and temperature exchange assembly 13.

Temperature exchange assembly 13 includes input port 19 for receiving air to be cooled or heated. The air is pulled through temperature exchange assembly 13 by a blower disposed within blower assembly 15. As the air passes through temperature exchange assembly 13, it is either heated or cooled, and directed outward of blower assembly 15 into plenum assembly 17 for passage to the interior of the vehicle through the existing vehicle ventilating system, or through a duct system provided and installed in the vehicle at the time the unit is installed.

In one embodiment, plenum assembly 17 includes a plurality of vent ports 21, 23, 25, and one or more defrost ports 27. Plenum assembly 17 further includes a means for selectively diverting air between vent ports 21, 23, 25, and defrost port 27, to allow the unit to serve as a defrost unit also.

The preferred embodiment of the heating and cooling unit of the present invention further includes a switch panel 29 which contains the electrical operator controls for the unit. These controls include blower speed switch 37, and temperature setting knob 39. Blower speed switch 37 is electrically coupled to the blower motor via a plurality of blower motor conductors 33. Temperature setting knob 39 is electrically coupled to temperature coil 31, which is a temperature probe. Temperature comparator 38 serves to compare the temperature setting at temperature setting knob 39 to the actual temperature sensed by temperature coil 31. When the actual vehicle air temperature is greater than the desired temperature setting at temperature setting knob 39, comparator 38 (i.e. thermostat) switches on, and operates through compressor clutch conductor 35 to activate a refrigeration circuit.

Figure 2:
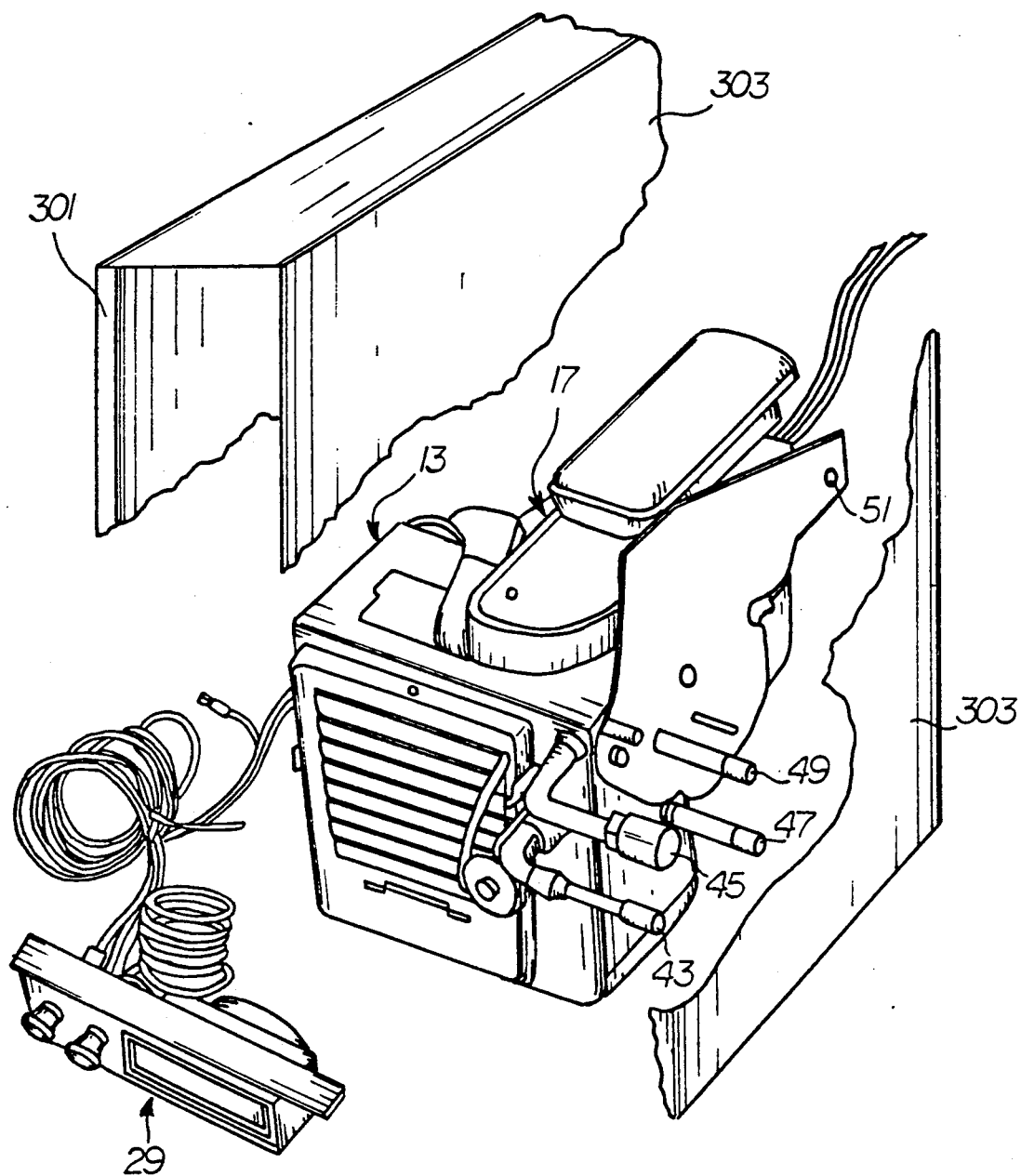
FIG. 2 is a perspective view of the back and one side of the vehicle heating and cooling unit of the present invention.

Heating and cooling unit 11 is adapted to be mounted under the vehicle dashboard 301 (in FIG. 2), adjacent the vehicle fire wall 303 (which is shown on simplified and fragmentary view on FIG. 2). Mounting plate 41 is provided along the back side of heating and cooling unit 11 and contains a plurality of mounting holes 51.

FIG. 2 is a perspective view of the back and one side of the vehicle heating and cooling unit of the present invention. A plurality of intake and exhaust tubes are provided which are coupled to components under the vehicle hood. Preferably, the intake and exhaust tubes are directed through holes which are cut into the vehicle fire wall. More specifically, refrigerant intake 43 is provided for receiving a fluidic refrigerant. Refrigerant is directed through a coil network contained within temperature exchange assembly 13. Fluid is directed outward of temperature exchange assembly 13 through refrigerant exhaust 45. Engine coolant intake 47 is provided for receiving antifreeze from the vehicle cooling circuit. The antifreeze is directed through a coil network contained within temperature exchange assembly 13 and is directed outward of temperature exchange assembly 13 by engine coolant exhaust 49. Of course, engine coolant which has been circulated through the hot engine is quite hot, and serves as a heating fluid. The refrigerant is a standard refrigerant used in air conditioning systems.

Figure 3:
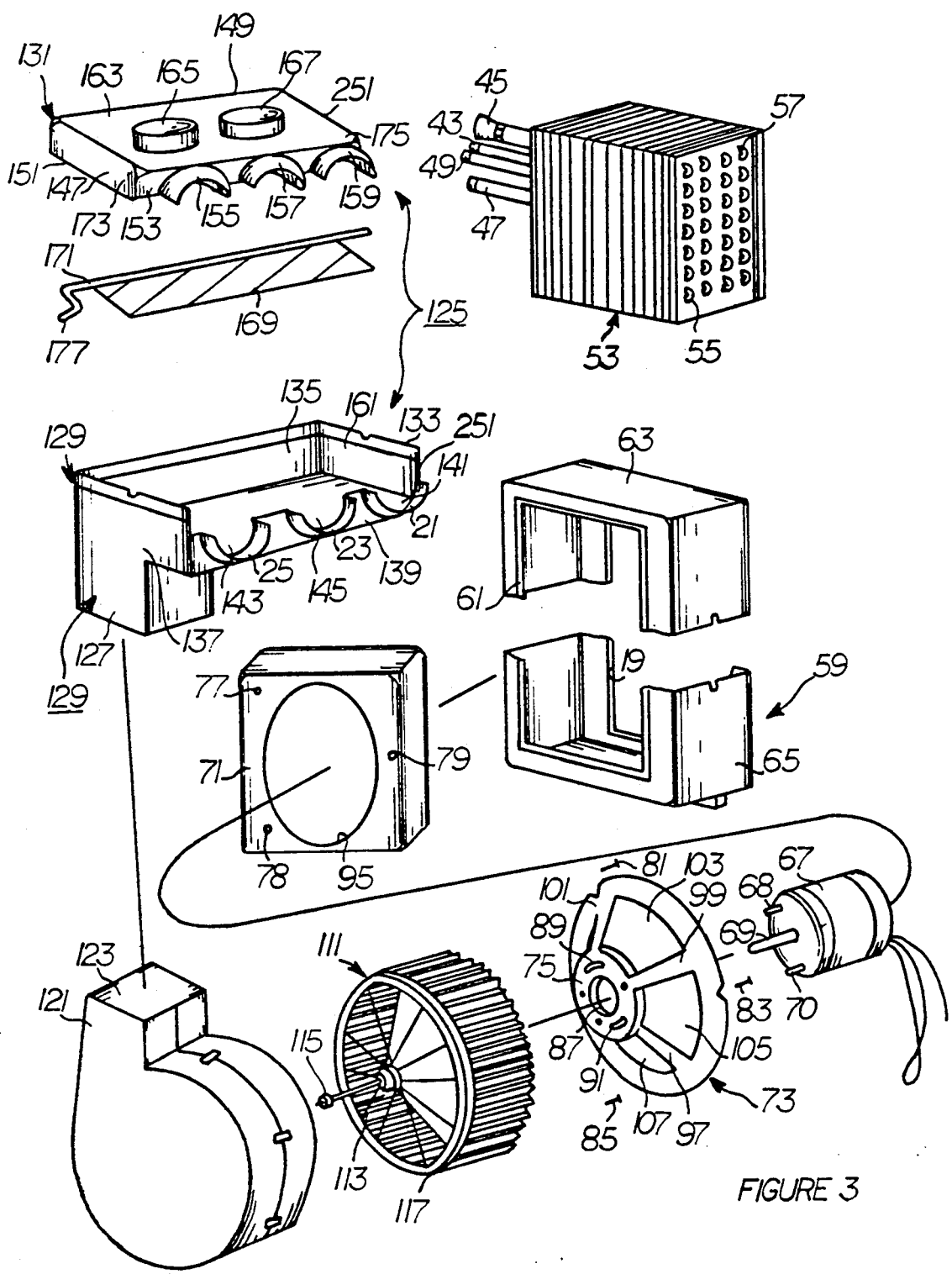
FIG. 3 is an exploded view of the preferred vehicle heating and cooling unit of the present invention.

FIG. 3 is an exploded view of the preferred heating and cooling unit 11 of the present invention. Preferably, temperature exchange coils 53 include heating coils 55 and cooling coils 57. As discussed above, heating coils are coupled to the engine coolant system by engine coolant intake 47, and engine coolant exhaust 49. Cooling coils 57 are coupled to an air conditioning circuit by refrigerant intake 43, and refrigerant exhaust 45. However, it is possible to construct a device according to the present invention which only heats, or only cools. A heating unit could be constructed by providing only heating coils 55, and no cooling coils 57. Alternately, a cooling only unit can be provided by providing cooling coils 57 and no heating coils 55. A two piece rectangular coil housing 59 is provided for receiving temperature exchange coils 53. In the preferred embodiment, coil housing 59 includes top coil housing section 63 and bottom coil housing section 65 which coupled together. Input port 19 is provided in one side facing of coil housing 59. Blower port 61 is formed in the opposing side wall of coil housing 59, in axial alignment with input port 19.

Blower motor 67 is also disposed in coil housing 59, and includes mounting bolts 68, 70 and blower motor shaft 69. Blower motor 67 is axially aligned with input port 19, and blower port 61.

Motor adaptor plate 71 is provided for coupling to coil housing 59 at blower port 61. Motor adaptor plate may be secured either inside or outside of coil housing 59. Motor adaptor plate 71 serves to hold motor mount 73 by screws 81, 83, 85 at mounting hole 77, 78, 79. Motor mount 73 includes a central mounting disk 75 with a motor shaft bore 87, and motor mount bores 89, 91 which are adapted for receiving mounting bolts 68, 70 of blower motor 67. Central mounting disk 75 is concentrically carried in circular port 95 of motor adaptor plate 71 by outer ring 93 and radial arms 97, 99, 101. Radial arms 97, 99, 101 serve to carry central mounting disk 75 in the center of outer ring 93 and provide a plurality of air passages 103, 105, 107 (air passage 109 is obscured in FIG. 3).

Blower wheel 111 is affixed to blower motor shaft 69 through motor shaft bore 87 of central mounting disk 75 of motor mount 73. Specifically, blower motor shaft 69 is secured to blower wheel 111 at collar 113 by nut 115. Collar 113 is concentrically disposed within blower wheel 111 and secured in place by a plurality of radial spindles 117. Blower wheel 111 is disposed within blower housing 119. Blower housing 119 is generally cylindrical shaped, with a blower exhaust tunnel 121 tangential thereto forming a substantially rectangular exhaust 123.

Plenum 125 is adapted to be coupled to blower housing 119 at blower exhaust tunnel 121. Specifically, input shaft 127 is adapted in size and configuration to slightably engage blower exhaust tunnel 121. Plenum 125 consists of two pieces, lower plenum piece 129 and upper plenum piece 131. In the preferred embodiment, input shaft 127 is integrally formed with lower plenum piece 129 and is generally rectangular in configuration feeding a basin formed by a plurality of side walls 133, 135, 137. A front wall 139 includes three semicircular ports 143, 145, 141 which in-part define vent ports 21, 23, 25.

Upper plenum piece 131 is generally rectangular, with side walls 251, 149, 151 which mate with side wall 133, 135, 137 of lower plenum piece 129. Three semicircular ports 155, 157, 159 are provided in front wall 153 of upper plenum piece 131 and are aligned with semicircular ports 141, 143, 145 of lower plenum piece 129. Together, semicircular ports 141, 143, 145 and 155, 157, 159 form vent ports 21, 23, 25.

Plenum top 163 is provided in upper plenum piece 131, and is aligned with plenum bottom 161 which is provided in lower plenum piece 129. In one embodiment, plenum top 163 of upper plenum piece 131 includes defrost vents 165, 167.

Plenum assembly 17 further includes defrost baffle 169 which is coupled to pivot bar 171 which is carried in notches 173, 175 provided in side walls 147, 151 of upper plenum piece 131. The position of defrost baffle 169 may be changed by pivot arm 177. In operation, defrost baffle 169 may be positioned within defrost plenum 125 to selectively direct air between vent ports 21, 23, 25 and defrost ports 165, 167.

FIG. 4a is a perspective view of a defrost clearance adaptor 179 for use with plenum 125 as depicted in FIG. 3. Defrost plenum adaptor 179 couples to defrost vents 165, 167, and includes side vent 181 for directing defrost air at 90 degrees from the output of defrost vents 165, 167.

Heating and cooling unit 11 of the present invention can be provided without defrost capability, as shown in FIG. 4b, which is a perspective view of an alternate plenum for the vehicle heating and cooling 11 of the present invention. Plenum 183 is a single piece L-shaped plenum which includes rectangular input shaft 127 which feeds rectangular vent 185, for directing the hot or cold air through a 90 degree turn. Vent cover 187 is provided for coupling to rectangular vent 185, and includes a plurality of circular vent mounting ports 189, 191.

Figure 5:
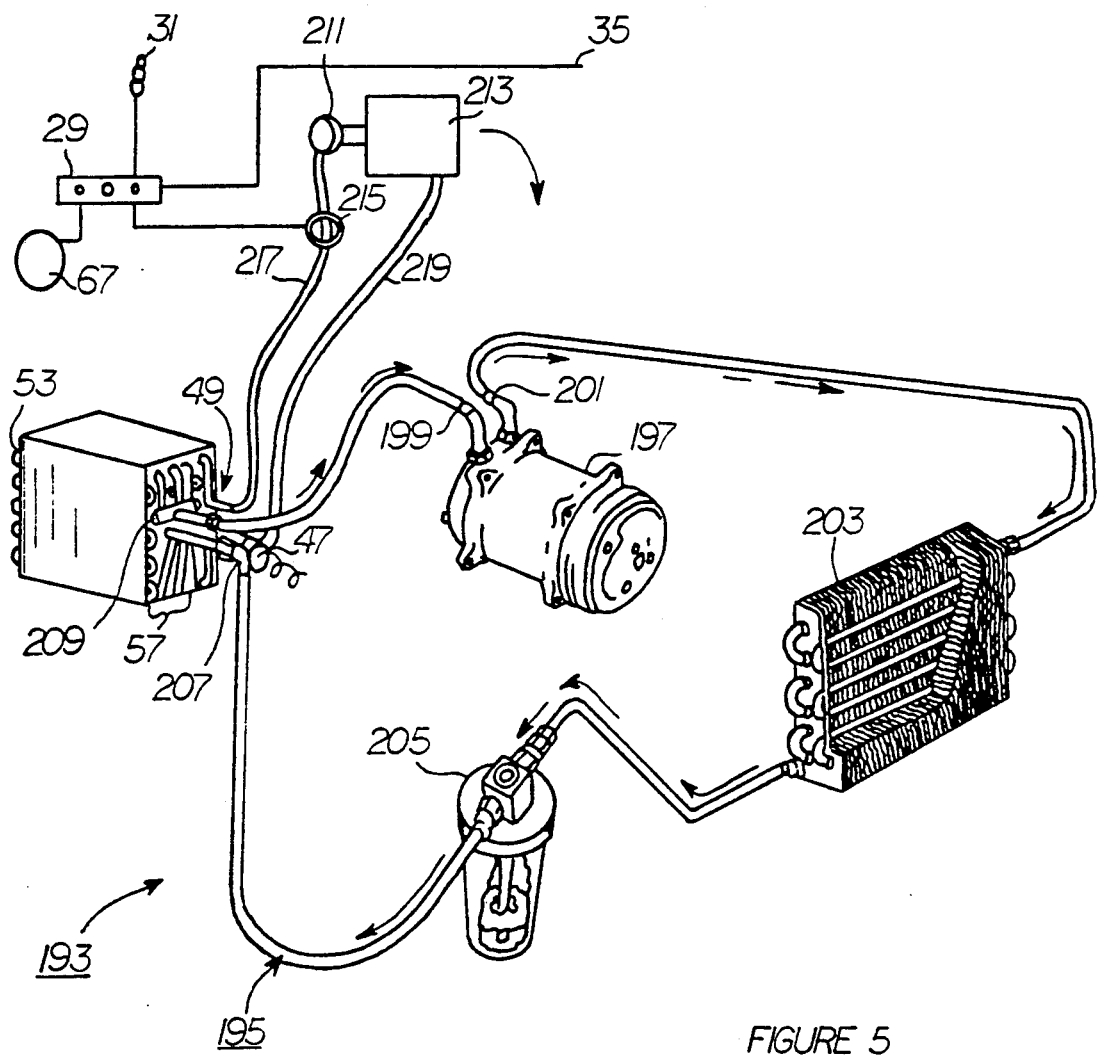
FIG. 5 is a circuit drawing of the preferred heating and cooling unit of the present invention in combination with heating and cooling circuits.

FIG. 5 is a circuit drawing of the preferred heating and cooling unit 11 of the present invention in combination with heating and cooling circuit 193. Air conditioning circuit 195 includes compressors 197 for pressurizing refrigerant. Compressor 197 has a suction intake 199 for receiving low pressure refrigerant in gaseous form, and an output 201 for discharging high pressure refrigerant in gaseous form. Compressor 197 also includes an electrically actuated clutch cycling system for engaging and disengaging the compressor in response to changes in vehicle ambient temperature as sensed to temperature coil 31, and transmitted by compressor clutch 35.

The automotive air conditioning circuit 195 also includes condenser 203 Which is coupled to compressor 197 for receiving high pressure refrigerant in gaseous form from output 201 and for discharging high pressure refrigerant in liquid form. Usually, refrigerant is routed from condenser 203 to a dryer 205 which serves to remove water and water vapor from the refrigerant.

The refrigerant is then routed to temperature exchange coils 53, and specifically cooling coils 57 through expansion valve 207. Cooling coil 57 serves an evaporator, which receives high pressure liquid refrigerant from condenser 203 and discharges refrigerant in the form of a low pressure gas from outlet tube 209.

When cooling is required, blower motor 67 is actuated simultaneously with air conditioning circuit 195 to cool the air drawn through heating and cooling unit 11. When heating is required, engine coolant is diverted from engine coolant reservoir 213 by engine coolant pump 211 to engine coolant intake 47 of temperature exchange coils 53. Hot engine coolant is circulated through heating coils 55, and removed via engine coolant exhaust 49. Electromechanical switch 215 is provided in line 217, which feeds engine coolant intake 47. Electromechanical switch 215 is actuated by a switch 221 in the interior of the vehicle, and serves to control the passage of fluid from engine coolant reservoir 213 to heating coils 55.

The present invention has a number of significant advantages over prior art retrofit heating and cooling units. First, the unit of the present invention is quite compact, and minimizes the space requirements. Second, the unit of the present invention mounts the blower motor in the same housing with the temperature exchange coils, and axially aligns the temperature exchange coils with a blower wheel to minimize the distance of travel between the temperature exchange coils and the blower wheel, while minimizing the number of turns of the heated or cooled air. Third, the unit of the present invention has a defrost plenum which allows for defrost capabilities. Fourth, the unit of the present invention is modular in design and thus can be easily reconfigured to adapt to a variety of vehicles, including boats, automobiles, recreational vehicles, airplanes, etc.

Although the invention has been described with reference to a specific embodiment, this description is not meant to be construed in a limiting sense. Various modifications of the disclosed embodiment as well as alternative embodiments of the invention will become apparent to persons skilled in the art upon reference to the description of the invention. It is therefore contemplated that the appended claims will cover any such modifications or embodiments that fall within the true scope of the invention.

What is claimed is:

1. A vehicle air treatment unit adapted for use in a vehicle having a passenger compartment and an engine compartment which are separated at least in-part by a firewall which is located rearward and downward from a vehicle dashboard within said vehicle compartment, comprising:

temperature exchange assembly including cooling coils for receiving a cooling fluid from said engine compartment and heating coils for receiving a heating fluid from said engine compartment;

a coolant circulator, disposed within said engine compartment, for selectively circulating said cooling fluid through said cooling coils of said temperature exchange assembly;

a heating circulator, disposed within said engine compartment, for selectively circulating said heating fluid through said heating coils of said temperature exchange assembly;

a coil housing for said temperature exchange assembly, having an input port for receiving air and an exhaust port;

a plurality of intake and exhaust members, for said cooling and heating coils, extending generally rearward from said coil housing, passing through ports provided in said firewall for coupling with said heating and coolant circulators within said engine compartment;

a blower motor disposed at least in-part within said coil housing adjacent said temperature exchange coils, having a motor shaft extended outward from said exhaust port of said coil housing;

a motor mount coupled to said coil housing at said exhaust port for coupling said blower motor in a fixed position relative to said coil housing;

a blower wheel coupled to said motor shaft at said exhaust port of said coil housing;

a blower housing disposed about said blower wheel;

means for mounting at least said coil housing to said firewall of said vehicle within said passenger compartment and under said dashboard;

wherein said blower motor operates to pull air through said temperature exchange coils by rotating said blower wheel within said blower housing; and means for selecting between a cooling mode of operation and a heating mode of operation, wherein during said cooling mode cooling fluid is circulated through said cooling coils and heating fluid is not circulated through said heating coils, and wherein during said heating mode of operation heating fluid is circulated through said heating coils and cooling fluid is not circulated through said cooling coils.

2. A vehicle air treatment unit according to claim 1, further comprising a plenum coupled to said blower housing for receiving air from said blower wheel.

3. A vehicle air treatment unit according to claim 1, further comprising a plenum coupled to said blower housing for receiving air from said blower wheel, said plenum including a baffle for selectively directing air flow between a plurality of vent duct ports.

4. A vehicle air treatment unit according to claim 1, further comprising a plenum coupled to said blower housing for receiving air from said blower wheel, said plenum including a baffle for selectively directing air flow between a plurality of vent ducts, including a defrost vent duct.

5. A vehicle air treatment unit according to claim 1 wherein said blower wheel and temperature exchange coils are axially aligned to draw air from the interior of said vehicle through said temperature exchange coils and directly into said blower wheel.

6. A vehicle air treatment unit according to claim 1, for use in a vehicle having an engine cooled by engine coolant fluid, wherein said heating coils are coupled for receiving said engine coolant during said heating mode.

7. A vehicle air treatment unit adapted for use in a vehicle having a passenger compartment a nd an engine compartment which are separated at least in-part by a firewall which is located rearward and downward from a vehicle dashboard within said vehicle compartment, comprising:
   temperature exchange assembly including cooling coils for receiving a cooling fluid from said engine compartment and heating coils for receiving a heating fluid from said engine compartment;
   a coil housing for said temperature exchange assembly, having an input port for receiving air and an exhaust port for discharging air;
   a plurality of intake and exhaust members, for said cooling and heating coils, extending generally rearward from said coil housing, passing through ports provided in said firewall for coupling with said heating and coolant circulators within said engine compartment;
   a blower assembly coupled to said exhaust port of said coil housing, in substantial axial alignment therewith, for selectively pulling air through said temperature exchange assembly; and
   means for selecting between a cooling mode of operation and a heating mode of operation, wherein during said cooling mode of operation cooling fluid is circulated through said cooling coils and heating fluid is not circulated through said heating coils, and wherein during said heating mode of operation heating fluid is circulated through said heating coils and cooling fluid is not circulated through said cooling coils.

8. A vehicle air treatment unit adapted for use in a vehicle having a passenger compartment and an engine compartment which are separated at least in-part by a firewall which is located rearward and downward from a vehicle dashboard within said vehicle compartment, comprising:
   at least one temperature exchange coil for receiving a thermal fluid from a temperature exchange fluidc circuit which is disposed within said engine compartment;
   a coil housing for said at least one temperature exchange coil having an input port for receiving air and an exhaust port for discharging air which has been passed over said at least one temperature exchange coil;
   a plurality of intake and exhaust port members, for said temperature exchange coil, extending generally rearward from coil housing, passing through ports provided in said firewall for coupling with said temperature exchange fluidc circuit which is disposed within said engine compartment;
   a blower assembly axially aligned with said intake and exhaust ports of said coil housing for drawing air through said coil housing by rotation of a blower wheel; and
   means for coupling at least said coil housing to said firewall in a location under said dashboard and within said passenger compartment.

9. A vehicle air treatment according to claim 8, wherein said at least one temperature exchange coil includes:
   a cooling coil for receiving cooling fluid from said temperature exchange fluidc circuit within said engine compartment.

10. A vehicle air treatment according to claim 8, wherein said at least one temperature exchange coil includes:
   a heating coil for receiving heating fluid from said temperature exchange fluidc circuit within said engine compartment.

* * * * *